United States Patent
Davis, III et al.

(10) Patent No.: US 8,280,791 B2
(45) Date of Patent: Oct. 2, 2012

(54) DEVICES, SYSTEMS AND METHODS FOR IDENTIFYING AND/OR BILLING AN INDIVIDUAL IN A VEHICLE

(75) Inventors: John Potts Davis, III, Marietta, GA (US); Justin Michael Anthony McNamara, Atlanta, GA (US); Jay Daryl Rector, Loganville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 302 days.

(21) Appl. No.: 12/632,857

(22) Filed: Dec. 8, 2009

(65) Prior Publication Data

US 2011/0137773 A1    Jun. 9, 2011

(51) Int. Cl.
*G07F 19/00* (2006.01)
(52) U.S. Cl. ............. 705/34; 705/13; 705/74; 340/5.61; 455/41.1; 713/194
(58) Field of Classification Search .................... 705/13, 705/74; 340/928, 5.42; 235/384; 380/24
See application file for complete search history.

(56) References Cited

U.S. PATENT DOCUMENTS

| | | | |
|---|---|---|---|
| 5,485,520 A * | 1/1996 | Chaum et al. .................... 705/74 |
| 5,777,565 A * | 7/1998 | Hayashi et al. ................ 340/928 |
| 7,031,809 B2 | 4/2006 | Sorensen et al. |
| 7,091,825 B2 | 8/2006 | Sahai |
| 7,171,187 B2 * | 1/2007 | Haave et al. ................ 455/404.2 |
| 7,304,564 B2 | 12/2007 | Yang et al. |
| 7,347,368 B1 * | 3/2008 | Gravelle et al. ................ 235/384 |
| 2003/0001755 A1 * | 1/2003 | Tiernay et al. ................. 340/928 |
| 2006/0064345 A1 * | 3/2006 | Biet ................................ 705/13 |
| 2006/0136291 A1 * | 6/2006 | Morita et al. .................... 705/13 |
| 2006/0200379 A1 * | 9/2006 | Biet ................................. 705/13 |

* cited by examiner

Primary Examiner — Vanel Frenel
(74) Attorney, Agent, or Firm — Moazzam & Associates, LLC

(57) ABSTRACT

Devices, systems, and methods are disclosed for identifying a driver versus a passenger within a smart vehicle. This involves a determination of the relative positions of the wireless communication devices within the smart vehicle using near-field communication (NFC) or GPS, AGPS, etc. The wireless communication device detected closest to the driver seat is assumed to be the device owned by the driver. Once identified, the driver can be billed for tolls and other road services, based on the location of the smart vehicle. For instance, as the smart vehicle approaches a toll, a notification can be sent to all of the wireless communication devices. A response from a particular wireless communication device will result in the corresponding user's account being billed for the toll. Further, the smart vehicle can communicate with near-field transceivers placed, for instance, alongside a High-Occupancy Vehicle (HOV) lane. A driver of the vehicle can be billed, fined, or ticketed based upon a determination of an absence of passengers in the smart vehicle.

20 Claims, 14 Drawing Sheets

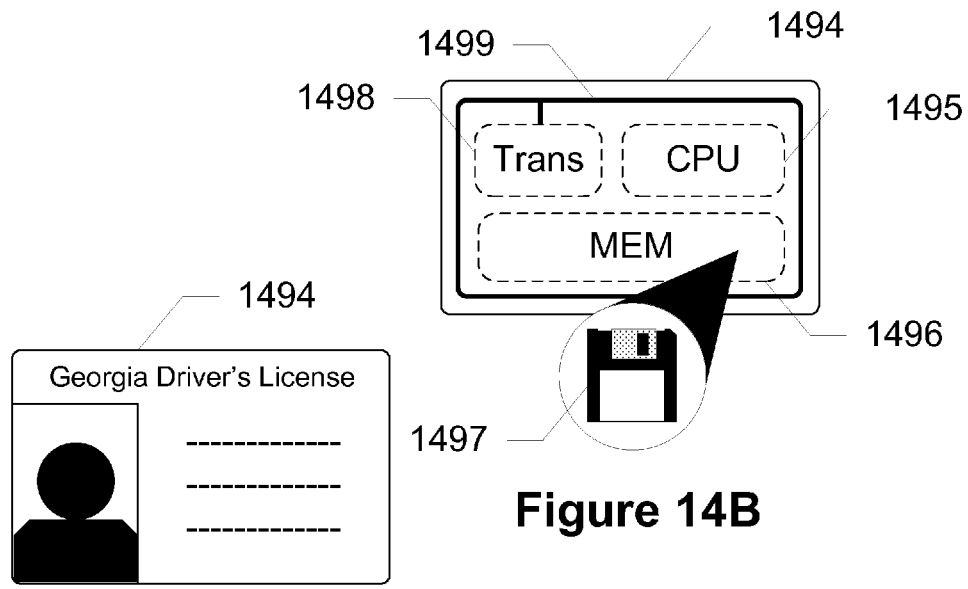
Figure 14B
Figure 14A
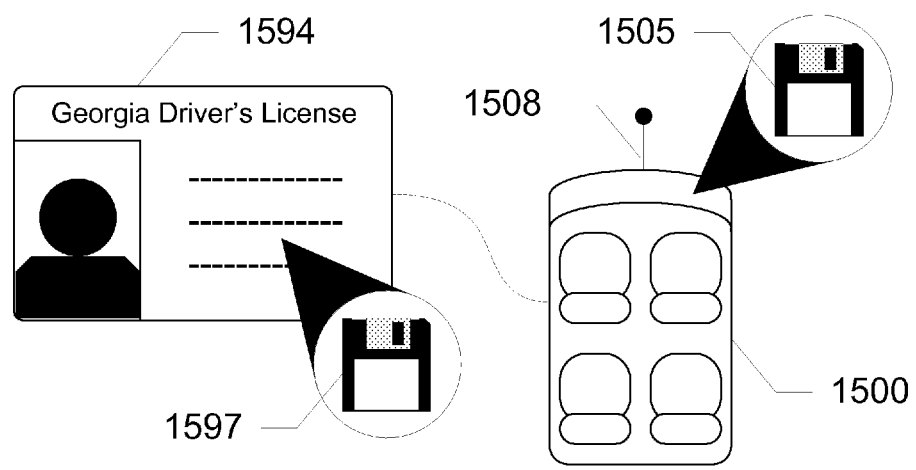
Figure 15

DEVICES, SYSTEMS AND METHODS FOR IDENTIFYING AND/OR BILLING AN INDIVIDUAL IN A VEHICLE

BACKGROUND OF THE INVENTION

1. Field of the Invention

The present invention relates to vehicle driver identification. More specifically, the present invention relates to determining the driver versus the passengers of a vehicle.

2. Background of the Invention

In the case of vehicular traffic on a roadway, waterway, etc., there are several archaic and time-consuming procedures that are undergone by drivers, municipalities, and law enforcement. Specifically, the payment of tolls requires drivers to stop at a toll booth, or purchase an EZ-Pass® card and set up the account. Driving on toll roads requires toll booths to be set up at specific distances along the road. Driving in carpool or High-Occupancy Vehicle (HOV) lanes requires constant monitoring and enforcement by traffic police to ensure that vehicles without passengers remain out of the HOV lane. Further, collecting fees for tolls, lane usage, fines, etc. is a complex process requiring issuing tickets, or billing several separate accounts for the driver. Several costs are incurred by the municipality in enforcing payments, and by the driver in keeping track of tickets, late fees, etc.

Present-day technology can alleviate some of these problems. Notably, microelectronic devices are becoming more and more ubiquitous. By coupling processors, memories, and transceivers to these devices, almost any handheld object can become a wireless communication device capable of transmitting and receiving data over a network. It is easy to set up a personal-area network with a few such devices incorporated into various everyday objects. However, this functionality is currently not being exploited to its full level. In the case of paying tolls, a driver is still required to stop at a toll booth or purchase and set up a separate account. Traffic police are still manually controlling a driver's use of an HOV lane.

Some vehicles have transceivers coupled to them, such as cellular or GPS units, but are still unable to measure or transmit several crucial pieces of information that would otherwise be useful in billing or charging a driver of the vehicle. Finally, any enforcement of fines, tickets, etc. is still based on a paper-based system using postal mail to deliver ticket notices, and receive payments.

What is needed is a means for seamlessly charging and/or billing a driver of a vehicle in real-time, based upon the location of the vehicle, and the number of passengers in the vehicle.

SUMMARY OF THE INVENTION

The present invention addresses the above-identified issues by identifying a driver versus a passenger within a smart vehicle. In exemplary embodiments of the present invention, this involves a determination of the relative positions of the wireless communication devices within the smart vehicle using near-field communication (NFC) or GPS, AGPS, etc. The wireless communication device detected closest to the driver seat is assumed to be the device owned by the driver. Once identified, the driver can be billed for tolls and other road services, based on the location of the smart vehicle. For instance, as the smart vehicle approaches a toll, a notification can be sent to all the wireless communication devices. A response from a particular wireless communication device will result in the corresponding user's account being billed for the toll. Further, the smart vehicle can communicate with near-field transceivers placed, for instance, alongside a High-Occupancy Vehicle (HOV) lane. A driver of the vehicle can be billed, fined, or ticketed based upon a determination of an absence of passengers in the smart vehicle.

In one exemplary embodiment, the present invention is a system for billing a driver of a vehicle. The system includes a network, a smart vehicle in communication with the network, a wireless communication device in communication with the smart vehicle, a billing server on the network, the billing server including a user account for a user of the wireless communication device, a client logic on the smart vehicle to retrieve a unique identifier from the wireless communication device, determine a location of the smart vehicle, and transmit the unique identifier and the location to the billing server, and a server logic on the billing server to associate the unique identifier with the user account, and to bill the user account an amount based on the location.

In another exemplary embodiment, the present invention is a method for billing a driver of a vehicle. The method includes receiving a unique identifier from a wireless communication device in communication with a smart vehicle, determining that a user of the wireless communication device is a driver of the smart vehicle, determining the location of the smart vehicle, and transmitting the unique identifier and the location to a billing server on a network. The unique identifier is associated with a user account for the user, and the location is associated with an amount to be debited from the user account.

In yet another exemplary embodiment, the present invention is a smart vehicle. The smart vehicle includes a vehicle having a driver seat and a passenger seat, a processor coupled to the vehicle, a memory in communication with the processor, a transceiver in communication with the processor, an antenna coupled to the transceiver, the antenna positioned significantly closer to the driver seat than to the passenger seat, and a client logic on the memory to retrieve a unique identifier from a wireless communication device, determine a location of the vehicle, and transmit the unique identifier and the location to a billing server on a network. The unique identifier is associated with a user account for the user, and the location is associated with an amount to be debited from the user account.

BRIEF DESCRIPTION OF THE DRAWINGS

FIGS. 14A-14B show a contactless smart card embedded in a driver's license, according to an exemplary embodiment of the present invention.

FIG. 15 shows a smart vehicle detecting a driver's license, according to an exemplary embodiment of the present invention.

DETAILED DESCRIPTION OF THE INVENTION

Figure 1:
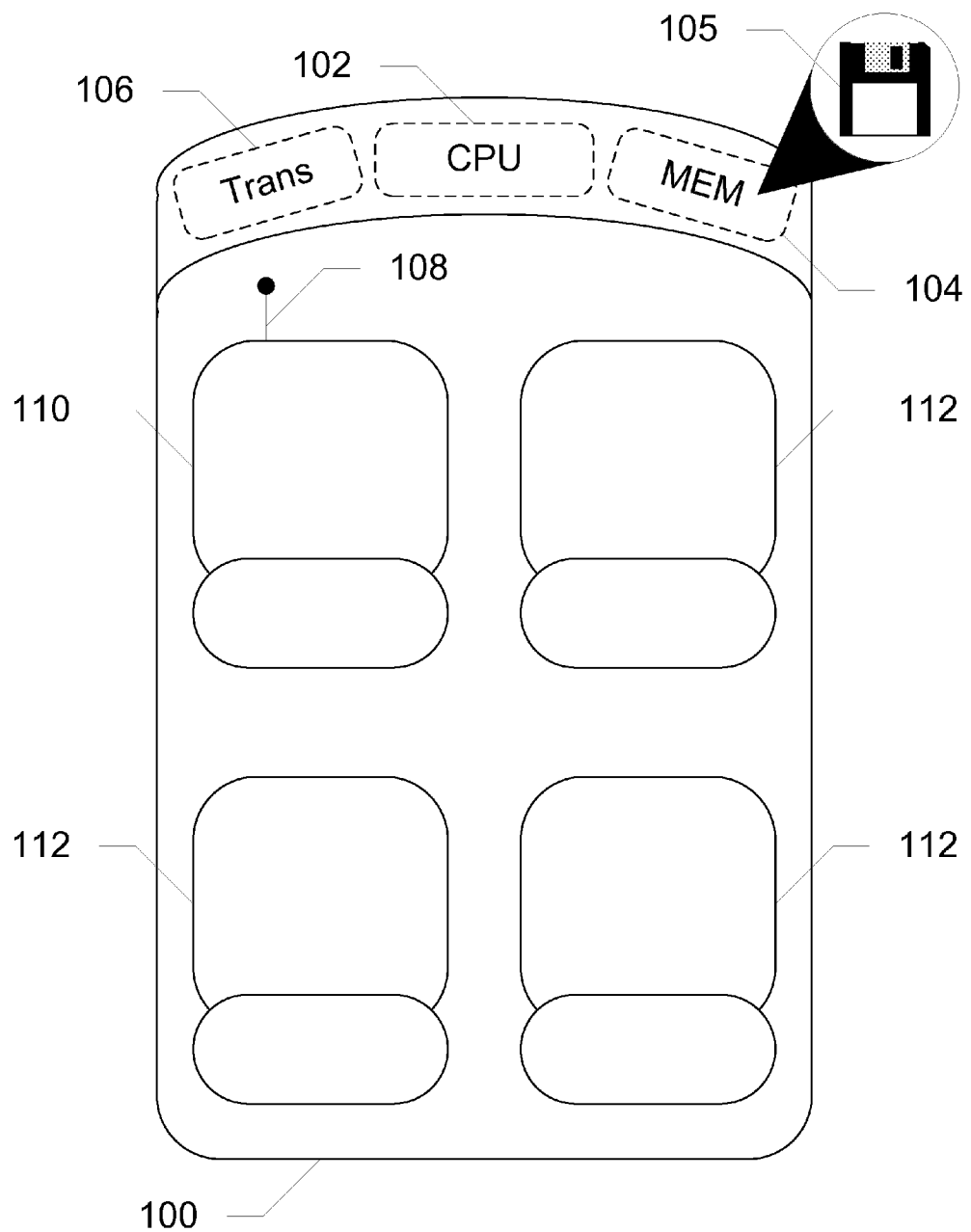
FIG. 1 shows a smart vehicle, according to an exemplary embodiment of the present invention.

The following detailed description discloses devices, systems, and methods for identifying a driver versus a passenger within a smart vehicle. In exemplary embodiments of the present invention, this involves a determination of the relative positions of the wireless communication devices within the smart vehicle using near-field communication (NFC) or GPS, AGPS, etc. The wireless communication device detected closest to the driver seat is assumed to be the device owned by the driver. Once identified, the driver can be billed for tolls and other road services, based on the location of the smart vehicle. For instance, as the smart vehicle approaches a toll, a notification can be sent to all the wireless communication devices within the smart vehicle. A response from a particular wireless communication device will result in the corresponding user's account being billed for the toll. Further, the smart vehicle can communicate with near-field transceivers placed, for instance, alongside a High-Occupancy Vehicle (HOV) lane. A driver of the vehicle can be billed, fined, or ticketed based upon a determination of an absence of passengers in the smart vehicle.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. A wireless communication device also includes smart cards, such as contactless integrated circuit cards (CICC). The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Wireless communication devices communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include Wi-Fi and BLUETOOTH® networks, with communication being enabled by hardware elements called "transceivers." A CICC, for instance, has an RFID transceiver. Wireless communication devices may have more than one transceiver, capable of communicating over different networks. For example, a cellular telephone can include a GPRS transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. A billing server is an example of such a server. A billing server can include several network elements, including other servers, and is part of the back-end of a network operator's network, for example, a cellular network. A billing server hosts or is in communication with a database hosting an account for a user of a wireless communication device. The "user account" includes several attributes for a particular user, including a unique identifier of the wireless communication device(s) owned by the user, relationships with other users, usage, bank account, and other information. A billing server may refer to other servers on different networks to update a user account.

A "vehicle," as used herein and throughout this disclosure, includes cars, trucks, and buses, as well as aircrafts and watercrafts.

A "location", as used herein and throughout this disclosure, is any physical location on an identifiable route or path (such as a road or waterway) that is specially designated for a purpose. An HOV lane can be a location. A toll booth can be a location. A location may include a geo-fence. A geo-fence is a virtual perimeter around a location such that when a smart vehicle enters or exits the location, a notification is generated. A location can be determined using GPS/A-GPS, or proximity to NFC transceivers. The area of the location can be controlled by the number and range of the NFC transceivers.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a smart vehicle, according to an exemplary embodiment of the present invention. In this embodiment, the smart vehicle is a vehicle 100, including a central processing unit (CPU) 102, a memory 104 storing a client logic 105, a transceiver 106, an antenna 108, a driver seat 110, and passenger seats 112. Vehicle 100 can be any car, truck, boat, or aircraft. CPU 102 commands components of vehicle 100 according to client logic 105 on memory 104. Transceiver 106 allows vehicle 100 to wirelessly communicate with other devices on a network, for instance a personal area network within vehicle 100, a near-field communication (NFC) transceiver outside vehicle 100, other wireless devices, and so on. This communication may be through cellular radio frequency (RF) signals, WiFi, BLUETOOTH, infrared (IR), etc. Antenna 108 is a transducer designed to transmit or receive electromagnetic waves.

The determination of a driver is performed by the smart vehicle, in this exemplary embodiment, as follows. Transceiver 106, via antenna 108, detects the presence of wireless communication devices located within vehicle 100. Each occupant of vehicle 100 (such as occupants of driver seat 110 and passenger seats 112) carries with them a wireless communication device such as a cellular telephone or a contactless smart card. Each wireless communication device is able to transmit a unique identifier corresponding to a user account for the user of the device. In the case of a cellular telephone, the unique identifier may be an MSISDN, IMSI, MAC address, etc. In the case of a contactless smart card, the unique identifier can be any alphanumeric, hexadecimal, or other unique string of characters. Using a personal area network, or near-field communication, antenna 108 transmits a request for a unique identifier from the wireless communication devices within range of antenna 108. The wireless communication devices respond with the unique identifier. Client logic 105 retrieves the unique identifier from each wireless communication device and associates the identifier with either a driver or a passenger. The location of the driver is determined via a proximity measurement derived from signal strength, delay, or other measurements from antenna 108. For instance, since antenna 108 is located closest to driver seat 110, the driver's wireless communication device has the strongest communication link to antenna 108, along with the shortest delay. Therefore, in the present embodiment, a driver is easily determined by placing antenna 108 significantly closer to the driver than any passenger. This ensures that antenna 108 perceives a measurable difference between signals from the driver and signals from a passenger.

The smart vehicle also determines a location of vehicle 100, according to this exemplary embodiment of the present invention. This determination may be performed via a GPS unit located in vehicle 100, or via a GPS unit located on a wireless communication device in communication with vehicle 100. For instance, a cellular telephone includes an AGPS unit, and transmits location coordinates to CPU 102 via transceiver 106. The determination of the location allows the smart vehicle to determine whether or not to submit a billing request to a billing server, which in turn bills the driver for driving in a particular location. Alternatively, the smart vehicle can constantly transmit a location to a server on the network, and a determination is made at the network whether or not to bill the driver. The smart vehicle may further communicate with roadside NFC transceivers. The NFC transceivers communicate location information to transceiver 106, and a determination is made to bill the driver based on the detected location.

To bill an occupant of the vehicle, a unique identifier and a location are transmitted to a billing server across a network, according to exemplary embodiments of the present invention. The billing server may be a part of the cellular network operator's billing subsystem, or may be part of an external billing system, such as one operated by a governmental entity. The billing system is flexible and may depend on a contractual arrangement between the network operator, such as a cellular service provider, and the governmental entity, such as a transit authority or municipality. Upon receiving the unique identifier and the location, a determination is made to bill a user account associated with the unique identifier, wherein the amount billed depends upon the location and/or other factors such as speed, time, etc. The user account can be managed by a network operator, governmental entity, etc., and may depend on the aforementioned contractual agreement. For instance, driving in the left lane during certain times of day may require a fee charged per vehicle, depending on the number of passengers in the vehicle, wherein the number of passengers corresponds to a determination of the number of wireless communication devices in the vehicle. In some exemplary embodiments, any occupant can be billed for the smart vehicle being in a particular location. A prompt transmitted to the occupants' wireless communication devices requests payment, and a confirmation received from one occupant's wireless communication device authorizes the transaction as further described below. The user account associated with the unique identifier of the wireless communication device can further be tied to a bank account or credit card, so that funds can be transferred. Alternatively the user is billed on a regular basis for his usage of the specific locations.

Figure 2:
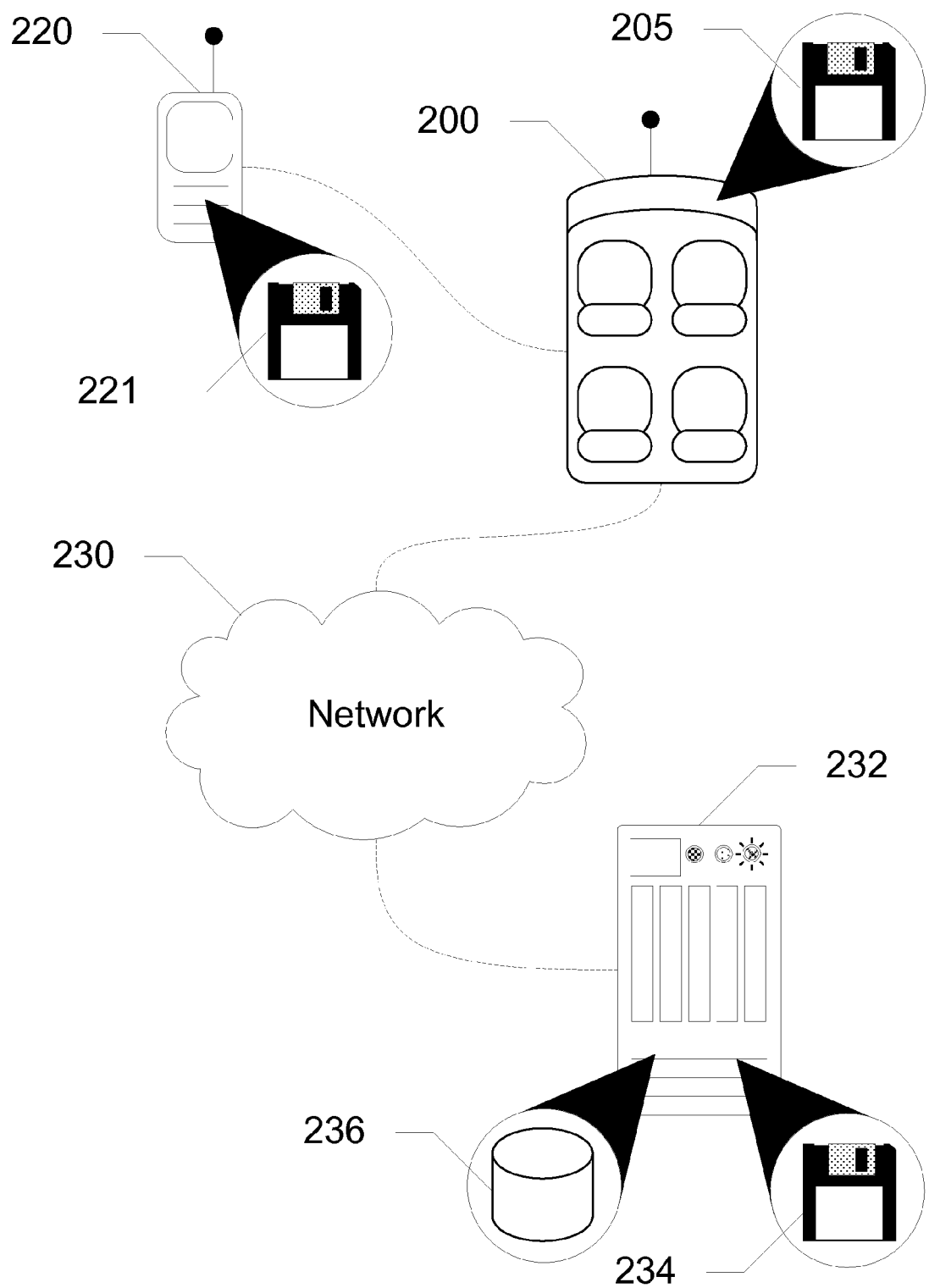
FIG. 2 shows a system for billing a driver of a smart vehicle, according to an exemplary embodiment of the present invention.

FIG. 2 shows a system for billing a driver of a smart vehicle, according to an exemplary embodiment of the present invention. In this embodiment, the system includes a smart vehicle 200 with a client logic 205, a wireless communication device 220 with a wireless logic 221, a network 230, and a billing server 232 with a server logic 234 and a database 236. Smart vehicle 200 is in communication with wireless communication device 220 and with billing server 232 over network 230. Wireless communication device 220 is shown outside smart vehicle 200 for purposes of showing the flow of communication only. It is to be understood that wireless communication device 220 is used by an occupant of smart vehicle 200. Smart vehicle 200 transmits a request to wireless communication device 220, and wireless logic 221 responds with the unique identifier. Client logic 205 on smart vehicle 200, via an antenna and transceiver, receives a unique identifier from one or more wireless communication devices 220, and uses triangulation, signal strength, or signal propagation delay to determine the relative positions of wireless communication devices 220 within smart vehicle 200.

Client logic 205 transmits the unique identifier and location to billing server 232 via network 230. This transmission may occur via Wi-Fi, GPRS, or other protocols capable of communicating such information across a wide-area network such as the Internet. Billing server 232 is part of a back end of network 230, or can be part of an external network operated by another service provider, such as a governmental or municipal entity. Billing server 232 includes a user account that is associated with the unique identifier transmitted from wireless communication device 220. Server logic 234 determines the association with the user account, and bills the user account an amount based upon the location of wireless communication device 220. The relationships between specific locations, such as toll booths, and the particular amount, are specified in a database 236. Database 236 can also store the user accounts and correlate the user accounts with the specific amounts to be charged per location. The user is then billed by debiting the account or by sending a bill to the user's address as stored in the user account.

Figure 3:
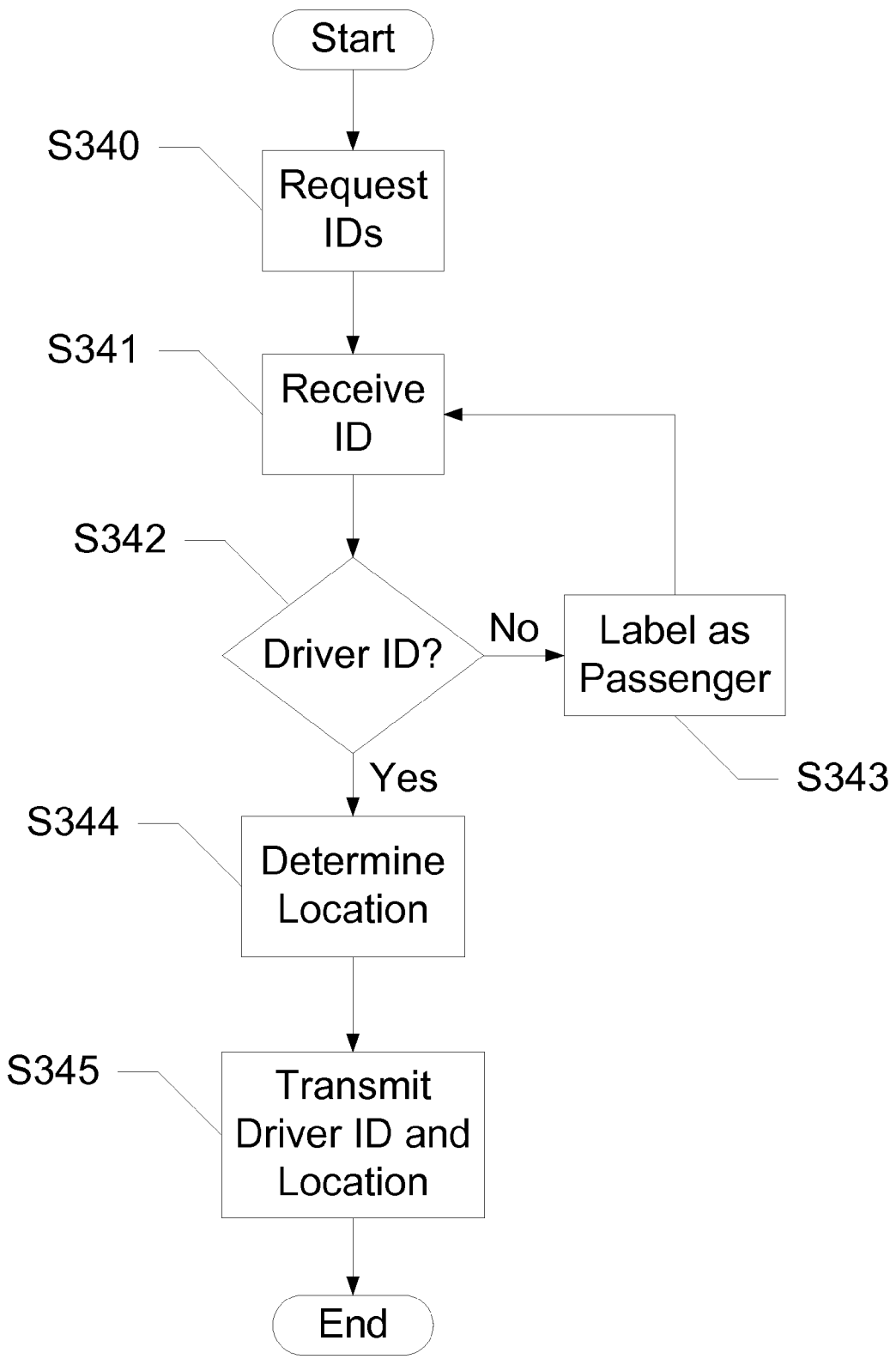
FIG. 3 shows a method of billing a driver of a vehicle, according to an exemplary embodiment of the present invention.

FIG. 3 shows a method of billing a driver of a vehicle, according to an exemplary embodiment of the present invention. In this embodiment, a smart vehicle requests the unique identifiers of wireless communication devices located within the smart vehicle S340. Each of these unique identifiers is associated with a user account. The unique identifiers may be requested upon occupants entering the vehicle, upon the driver starting the vehicle, or upon determining that a bill or payment needs to be executed. In either case, the unique identifiers are transmitted from the wireless communication devices and received by the smart vehicle S341. The process of requesting S340 and receiving S341 can happen via a personal area network, such as BLUETOOTH, or via NFC, using contactless smart cards. Alternatively a local area network using Wi-Fi or equivalent may be established between the smart vehicle and the wireless communication devices.

The smart vehicle then determines which of the wireless communication devices belongs to a driver of the smart vehicle S342. Determination S342 is performed using one or more antennas or receivers specifically positioned within the smart vehicle. Using the antennas, locations of the wireless communication devices are derived using triangulation, such as RFID or NFC triangulation, a measurement of signal strength/propagation delay, or an equivalent method. For instance, an antenna placed significantly closer to a driver seat than a passenger seat receives a stronger signal from a driver's wireless communication device than from a passenger's wireless communication device. Determination S342 can further utilize cellular radio frequency (RF) signals, WiFi, BLUETOOTH, infrared (IR), etc. Any unique identifier that is determined not to belong to the driver is labeled as a passenger's unique identifier S343. In this exemplary embodiment, the smart vehicle stops receiving unique identifiers after a driver has been identified. However, in other exemplary embodiments, the process of receiving unique identifiers S341 is repeated until all the devices in the smart vehicle are detected. At least one of the unique identifiers is associated with a driver. Once the driver is determined, restrictions may be placed upon the driver's wireless communication device. Such restrictions may prevent text messaging, web surfing, etc., while the smart vehicle is running. The restrictions may be executed via a "crippling" application installed on the driver's mobile communication device, by editing registry entries of an operating system of the driver's mobile communication device, by limiting services offered by the network during the course of driving the vehicle (such as disabling text messages), or by any equivalent means known in the art.

A location of the smart vehicle is then determined S344. The location includes any combination of specific roads or routes, specific lanes, toll booths or gates on a road, bridges, etc. A known location is stored in a location database and associated with a particular billing amount. The database can be stored anywhere, for instance on the memory in the smart vehicle itself, or on a network. The location is determined using a GPS on the smart vehicle, a GPS on one of the wireless communication devices within the smart vehicle, using AGPS on the smart vehicle or one of the wireless communication devices, etc. For instance, a service provider defines a geo-fence corresponding to a particular lane or toll booth. If the measured GPS coordinates fall within the geo-fence, then the appropriate location is determined and recorded. The location can also be determined by communicating with roadside NFC transceivers positioned in the location, for instance, alongside an HOV lane. The transceiver on the smart vehicle communicates with the NFC transceivers to retrieve the particular location. The smart vehicle then transmits the unique identification and the location to a network or billing server S345. The location of the smart vehicle and, in some embodiments, the number of passengers, is used to determine an amount to be debited from the user's account. The relationship between the location, the passengers, the amount to be billed, and the user account to be billed can all be stored in one or more databases distributed across the network. Furthermore a location database can be stored in the smart vehicle itself, and periodically updated from a server on the network.

As described herein, near-field communications (NFC) allows a smart vehicle to determine the number and identity of occupants in a vehicle, the location of the vehicle, the speed of the vehicle, and charge an occupant based on this information. For instance, based on the user's route choice, the user may be charged a toll. NFC transceivers placed along a toll area, or a toll booth, command the smart vehicle to determine a user's location and transmit the location to a server for billing purposes. This eliminates the need to stop, count money, etc.

Figure 4:
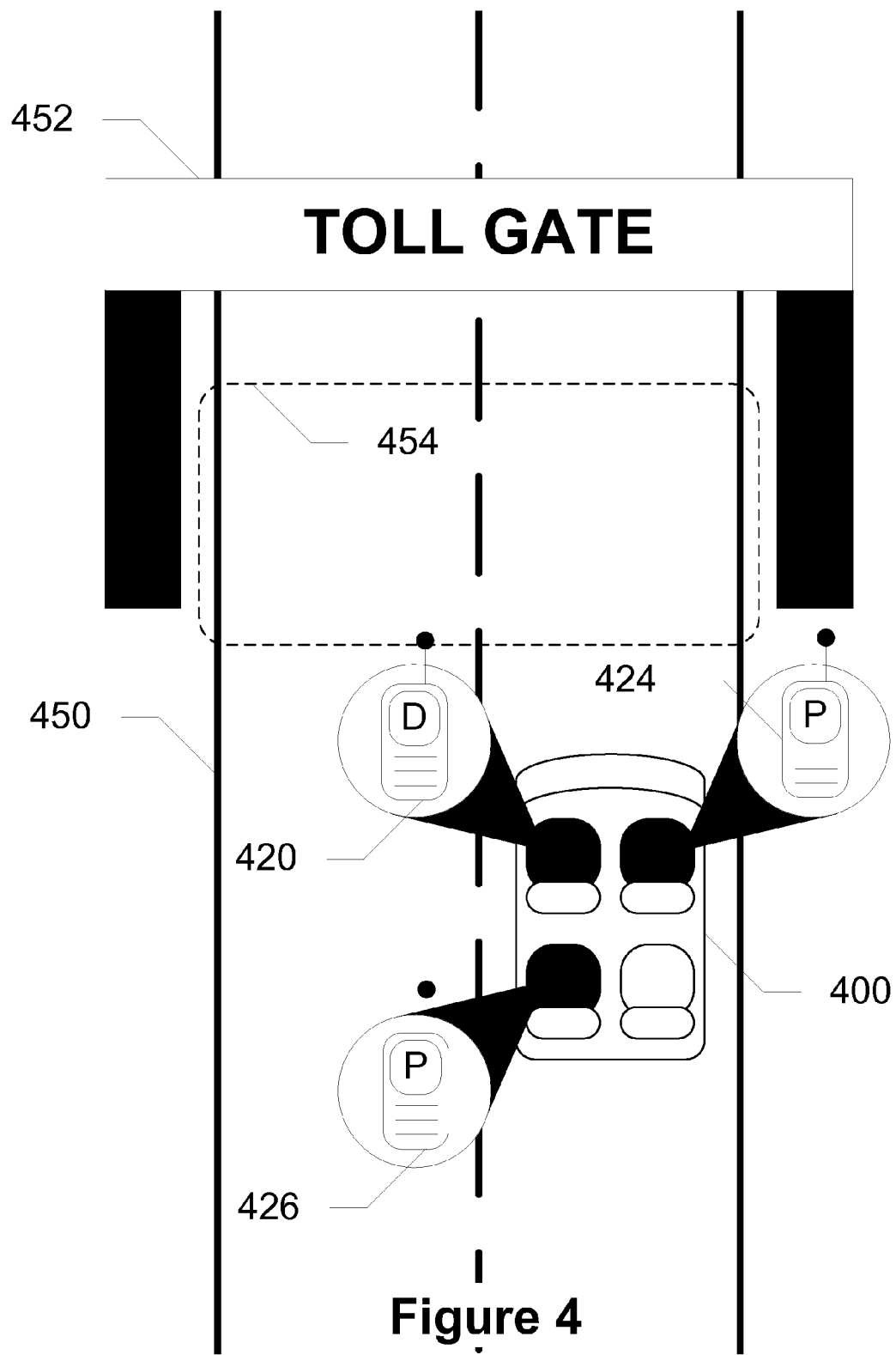
FIG. 4 shows a smart vehicle approaching a toll booth location, according to an exemplary embodiment of the present invention.

FIG. 4 shows a smart vehicle approaching a toll booth location, according to an exemplary embodiment of the present invention. In this embodiment, smart vehicle 400 is carrying three occupants: a driver, and two passengers. The driver is a user of driver's wireless communication device 420, a front seat passenger is a user of wireless communication device 424, and a backseat passenger is a user of wireless communication device 426. Smart vehicle 400 is traveling along road 450, approaching toll gate 452. Within the proximity of toll gate 452 is defined as a toll location 454. Toll location 454 may be defined by a geo-fence created by the toll gate operator, or toll location 454 is defined by the range of one or more roadside NFC transceivers.

An antenna and transceiver in smart vehicle 400 are used by a client logic to determine a relative position of each wireless communication device 420, 424, 426 located within smart vehicle 400. Smart vehicle 400 identifies the driver using the methods described herein, i.e. by capturing a unique identifier from driver's wireless communication device 420. When passing through toll gate 452, smart vehicle 400 enters toll location 454. Within toll location 454, smart vehicle detects the location by correlating the present location with a database of known locations. Alternatively, the correlation of the present location with toll location 454 is performed at a server on a network. In either case, smart vehicle 400 transmits the unique identifier of driver's wireless communication device 420, along with the location information 454, to a billing server using a cellular, GPRS, or equivalent network. The user account associated with driver's wireless communication device 420 is billed for the toll. Alternatively, smart vehicle 400 submits the unique identifier of the driver to a transceiver located in toll gate 452. Toll gate 452 sends the unique identifier along with a toll amount to a billing server which deducts the amount from a user account associated with the unique identifier. Other methods of transmitting the location and unique identifier to a billing system are possible.

Any or all of the occupants in the smart vehicle can pay the toll. The driver and passengers can decide between themselves which person is to pay the toll. In these embodiments, the designated occupant indicates to the smart vehicle that they will pay the toll. The driver and passengers may also decide to split the tolls, create an order for paying tolls, etc. This may be decided before the smart vehicle ever enters a toll lane, such as when the passengers get into the smart vehicle. Alternatively, this is decided when a toll amount is due, for instance, by sending a request to devices 420, 424, 426, and receiving a response from a particular wireless communication device.

Figure 5:
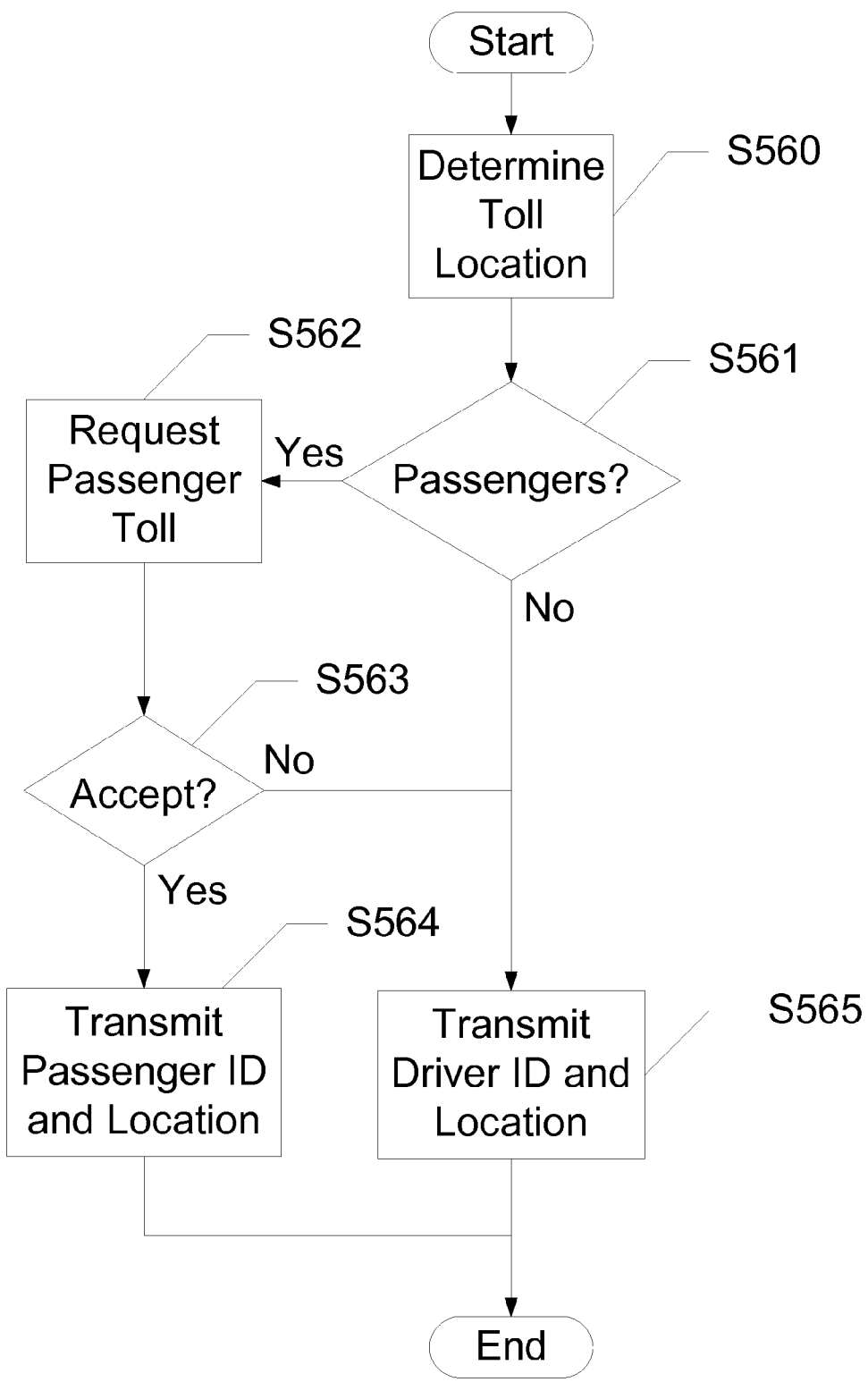
FIG. 5 shows a method for billing occupants of a smart vehicle approaching a toll booth location, according to an exemplary embodiment of the present invention.

FIG. 5 shows a method for billing occupants of a smart vehicle approaching a toll booth location, according to an exemplary embodiment of the present invention. In this embodiment, the smart vehicle determines that it is in a toll location S560. This can be performed by correlating presently detected coordinates with a pre-programmed known location on a database, as described above. Once it is determined that the location is a toll location, the smart vehicle determines if there are any passengers in the vehicle S561. This is determined by detecting the presence and identities of the wireless communication devices inside the smart vehicle. The determination of passengers can also be performed when the smart vehicle is first started. If there are passengers in the smart vehicle, then a request is submitted to the passengers, as well as the driver, to pay the toll S562. This may be accomplished by transmitting a request to the wireless communication device of each of the occupants, i.e. via a text message, or by communicating with an application installed on the occupants' cellular telephones. The request can also be displayed on an in-dash display within smart vehicle. The occupants are given a choice whether or not to accept the toll charges S563. If at least one of the occupants accepts the toll charges, then a unique identifier for that particular passenger's wireless communication device, along with a location of the smart vehicle, are transmitted S564 to a billing server, either directly or via the toll gate. If the passengers decline the toll charges, then a unique identifier from the driver's wireless communication device is used instead S565. Since the unique identifier of the driver is a default identifier to be used, even if no passengers are detected or present in the smart vehicle, the driver's unique identifier along with the location is transmitted S565.

Figure 6:
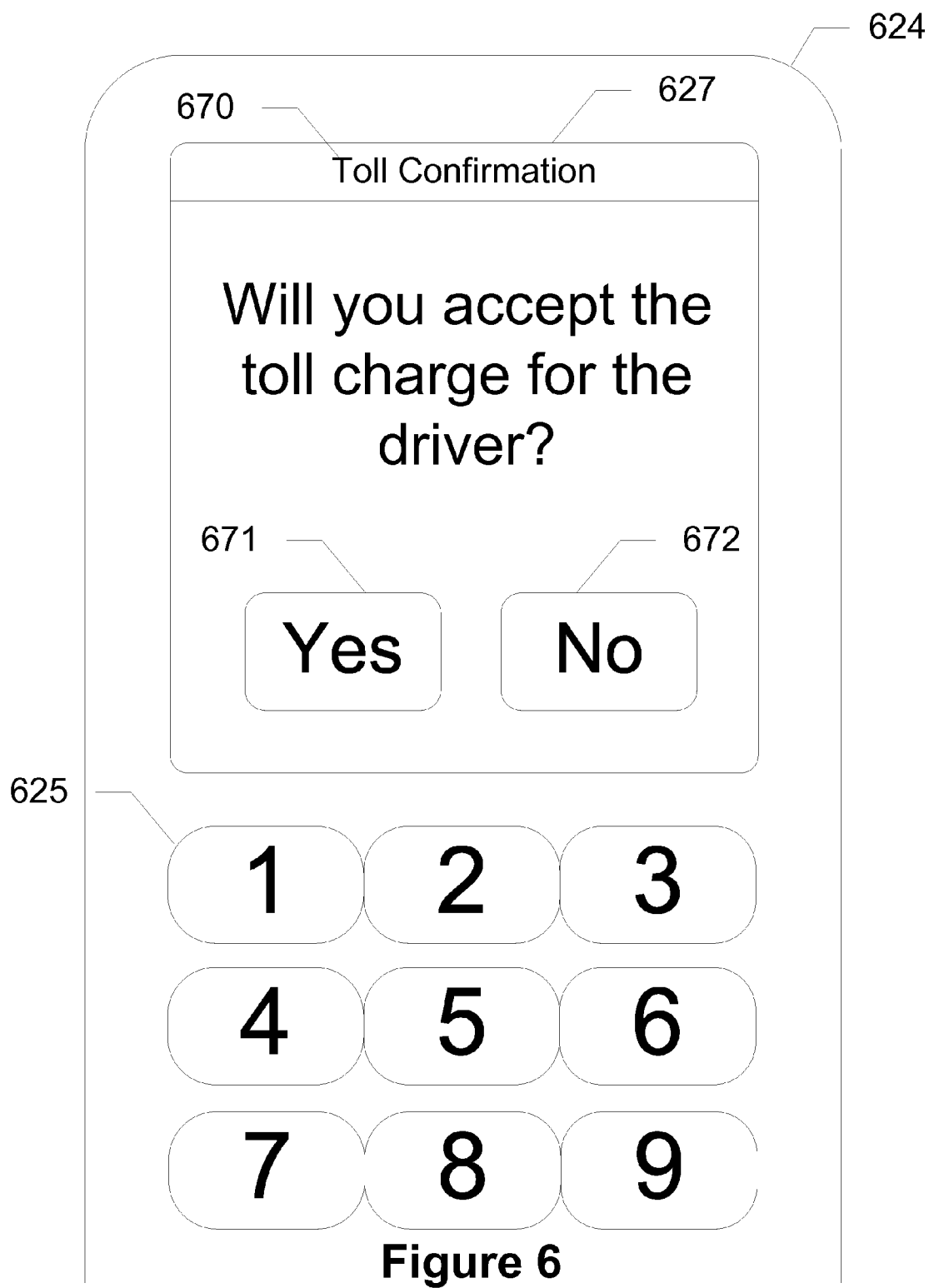
FIG. 6 shows a toll confirmation transmitted to a wireless communication device, according to an exemplary embodiment of the present invention.

FIG. 6 shows a toll confirmation 670 transmitted to a wireless communication device 624, according to an exemplary embodiment of the present invention. In this embodiment, wireless communication device 624 belongs to one of the passengers in a smart vehicle. Wireless communication device 624 includes a screen 627 and a keypad 625. Screen 627 displays toll confirmation 670, allowing the passenger to accept a toll charge for the driver. Toll confirmation 670 includes a 'Yes' button 671 and a 'No' button 672. Selecting 'Yes' button 671 confirms the passenger wishes to pay for the toll, and that a user account associated with a unique identifier from wireless communication device 624 is to be billed for the toll. Selecting 'No' button 672 confirms that the passenger does not wish to pay for the toll. Keypad 625 allows the passenger to input an acceptance or denial of the toll charge, as well as other commands. For example, the passenger may select to automatically pay all future tolls, never pay tolls, pay up to a certain amount, pay a certain percentage with the remainder to be split across the other occupants, and so on. A similar notification can be sent to a wireless communication device used by the driver, as well as to a display on the smart vehicle itself.

As mentioned above, the present invention also allows billing a driver or passenger for using an HOV lane. Geo-fencing can be used to define the boundaries of the HOV lane. Alternatively, NFC transceivers can be placed along the lane, tuned to a range having the width of the lane. When a smart vehicle enters the HOV lane, the driver's identity, a passenger count, and the location of the HOV lane is transmitted to a billing server. The driver can be billed based upon the number of miles driven in the HOV lane. A passenger count alerts the appropriate authorities whenever a vehicle is detected with a number of passengers less than what is required for the HOV lane. Enforcement of HOV passenger minimums is therefore significantly easier. Instead of having police officers check each and every vehicle, they can simply monitor alerts from smart vehicles communicating across a network.

Figure 7:
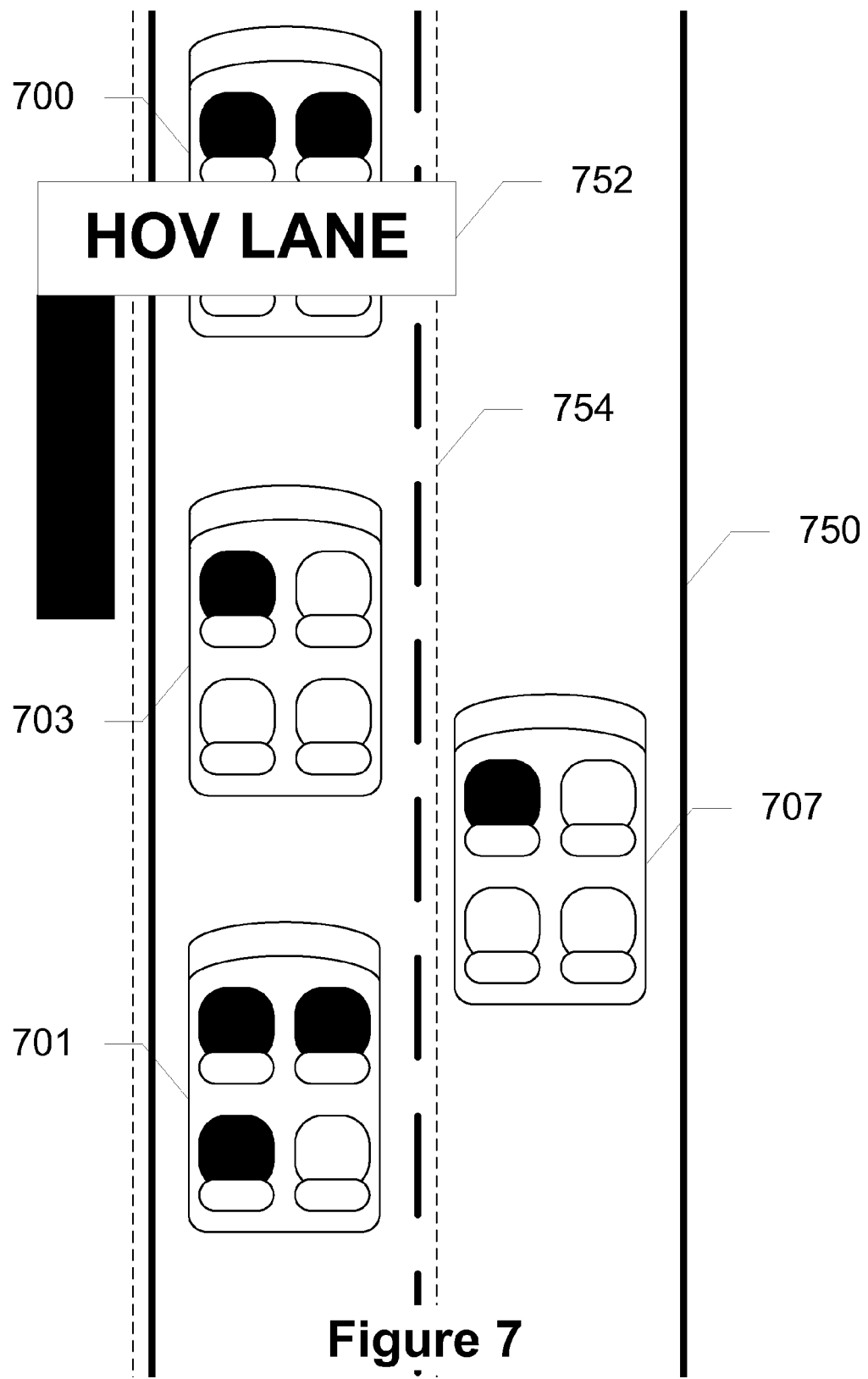
FIG. 7 shows smart vehicles on an HOV lane, according to an exemplary embodiment of the present invention.

FIG. 7 shows smart vehicles on an HOV lane, according to an exemplary embodiment of the present invention. In this embodiment, smart vehicles 700, 701, and 703 and 707 are traveling on a roadway 750. Roadway 750 is divided into two lanes, with one of the lanes being an HOV lane, indicated by HOV sign 752, and enclosed within the dotted area representing a geo-fence 754. The location of the HOV lane is established by defining geo-fence 754. Alternatively, NFC transceivers can be positioned along the left side of roadway 750. NFC transceivers can also be placed within HOV sign 752. The range of the NFC transceivers identifies the boundaries of the HOV lane. The HOV lane or other locations is restricted to a specific number of passengers. For example, traveling in the HOV lane may require a minimum of two passengers riding in the vehicle.

In the present embodiment, smart vehicles 700, 701, and 703 are riding in the HOV lane, while smart vehicle 707 is riding in a non-HOV lane. The smart vehicles detect the number of passengers each is carrying, using the methods described above. If a passenger count does not meet the minimum requirements of the HOV lane, then a notification may be transmitted to the appropriate authorities, or to a billing server. In some cases, a warning is transmitted to the driver, alerting the driver to change back to a regular lane before a ticket or fine is automatically issued. For instance, smart vehicle 701 detects three passengers, and smart vehicle 703 detects only one passenger. The smart vehicles transmit the passenger count of each to a billing server, potentially via the roadside NFC transceiver in HOV sign 752. The billing server compares the required minimum number of passengers with the passenger counts received from each smart vehicle. Smart vehicle 701 meets the minimum number of passengers necessary to ride in the HOV lane, which is one (in addition to the driver) in this case. Smart vehicle 703 does not meet the minimum number of passengers necessary to ride in the HOV lane. Thus, the driver of smart vehicle 703 may be notified via the driver's wireless communication device or via an in-dash display that the driver needs to move out of the HOV lane. The server can additionally submit an alert to the traffic police that smart vehicle 703 is improperly traveling in the HOV lane. Alternatively, the driver of smart vehicle 703 may be charged a fine for improper use of the HOV lane, similar to the billing in above embodiments.

Figure 8:
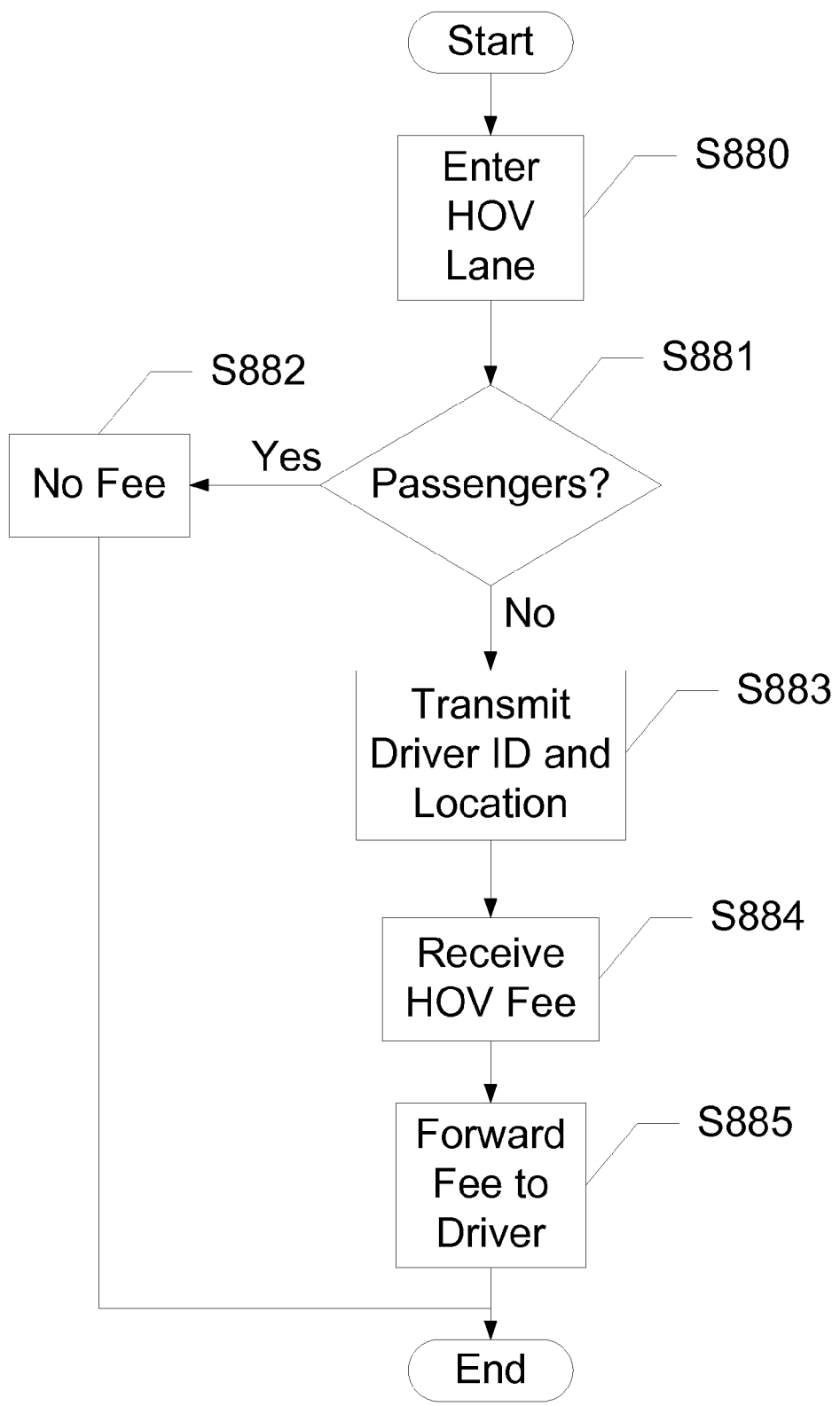
FIG. 8 shows a method for billing a driver of a smart vehicle on an HOV lane, according to an exemplary embodiment of the present invention.

FIG. 8 shows a method for billing a driver of a smart vehicle on an HOV lane, according to an exemplary embodiment of the present invention. In this embodiment, a smart vehicle determines that it is being driven in an HOV lane S880. This can be performed by correlating presently detected coordinates with a pre-programmed known location on a database or by detecting the presence of a geo-fence, as described above. The geo-fence may be defined by a network operator using GPS coordinates, or using a plurality of road side NFC transceivers equipped with BLUETOOTH®, Wi-Fi, or a similar short-range protocols. Once it is determined that the location is an HOV lane, smart vehicle determines the number of passengers in the smart vehicle S881. This is determined by detecting the presence and unique identifiers of the wireless communication devices inside the smart vehicle. The determination of passengers can also be performed when the smart vehicle is first started. If there are passengers in the smart vehicle, or if the passenger count meets the requirements for the HOV lane, then no fee is charged S882. If there are not any passengers in the smart vehicle, or not enough passengers, then a unique identifier from the driver's wireless communication device, along with a location of the smart vehicle, is transmitted through the NFC device or cellular network to a billing server S883. The billing server determines an HOV fee. The HOV fee may be based on the location, distance travelled in the HOV lane, etc. Once the smart vehicle exits the HOV lane the fee is calculated and a confirmation of the HOV fee is sent to the smart vehicle S884. The smart vehicle then forwards the confirmation of the HOV fee to the wireless communication device of the driver S885.

Besides using HOV lanes, the present disclosure also provides for the ability to charge users for using lanes specially designated for traffic at certain speeds. The user can be billed depending on how fast the smart vehicle is being driven. In a fast lane, for instance, NFC transceivers spaced every 100 meters can determine a speed of a user as well as the total distance traveled in the lane. Using this information the system can charge different rates based on how quickly traffic is moving. BLUETOOTH® is another possible protocol that can be used, depending on the required range for communicating with the smart vehicle. Specific lanes may be geo-fenced, with one amount being charged inside the fencing and another outside the fencing. Therefore, a user reaches his destination faster by paying a fee, based on the distance traveled in the fast lane.

The smart vehicle can transmit to the billing server several details that can be used to determine the amount for the toll or lane use fee. A location, a passenger count, speed, and distance driven on a lane are used to calculate a total fee. The breakdown of this can be transmitted to the driver in the form of an electronic receipt. The receipt can be transmitted to a driver's wireless communication device, or to a dashboard display in the smart vehicle.

Figure 9:
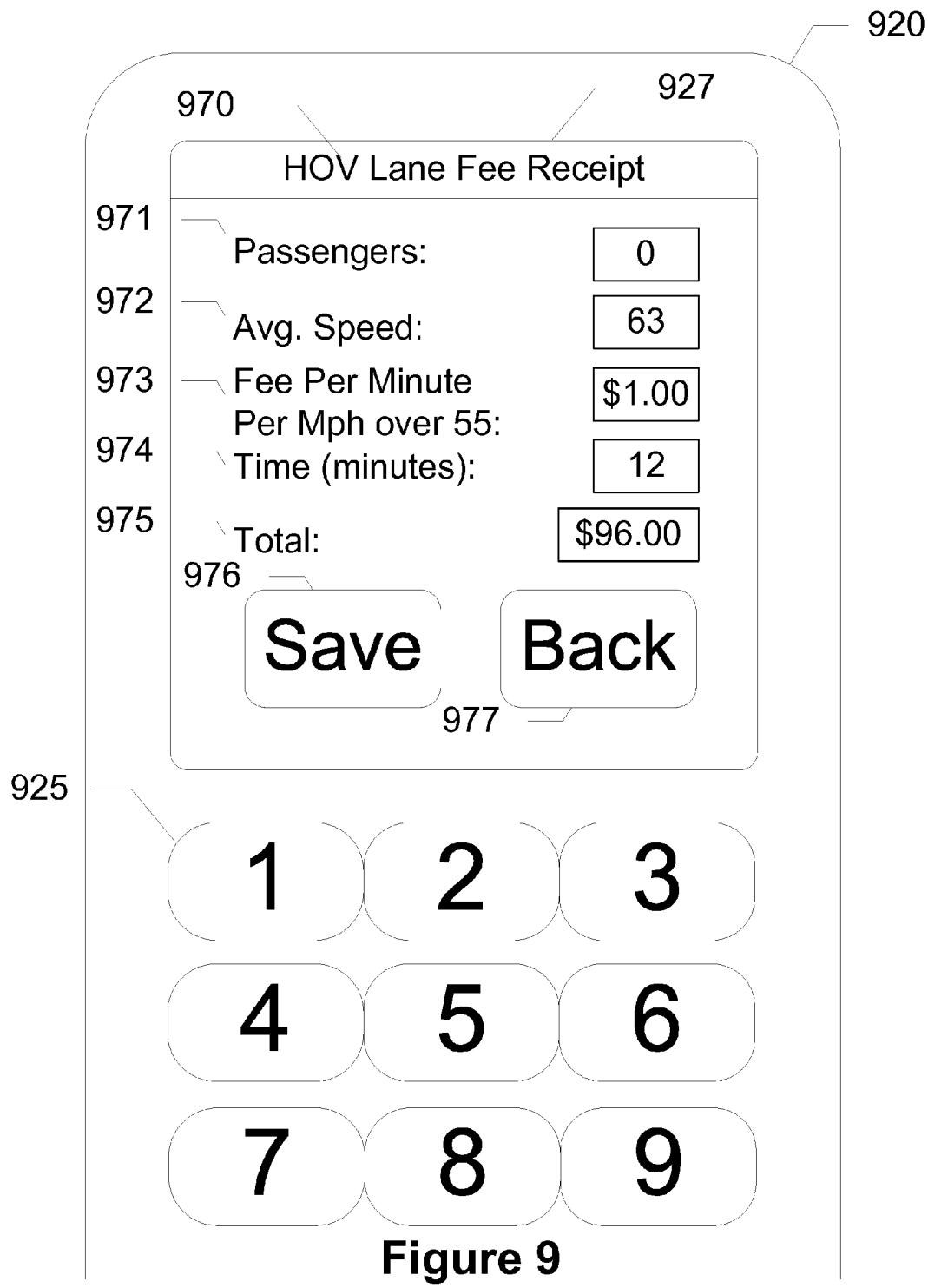
FIG. 9 shows a screenshot of an HOV lane fee on a wireless communication device, according to an exemplary embodiment of the present invention.

FIG. 9 shows a screenshot of an HOV lane fee receipt 927 transmitted to a wireless communication device 920, according to an exemplary embodiment of the present invention. Wireless communication device 920 has a keypad 925, a screen 927, and HOV Lane Fee Receipt 970 displayed on screen 927. HOV Lane Fee Receipt 970 includes a passenger count 971, an average speed 972, a speed fee 973, a total time 974, and a total amount 975 for the fee. In this instance, the driver has traveled at a speed of 63 mph, which is 8 mph in excess of the maximum speed of 55 mph. Additionally, the driver has traveled with zero passengers in the HOV lane for a time of 12 minutes. $8.00 per minute for 12 minutes results in a fine of $96.00. HOV Lane Fee Receipt 970 can be received in the form of a text message, or on an application on wireless communication device 920. The driver has the option of saving 976 or returning 977 to a previous screen. Keypad 925 allows the driver to select options from screen 920, place calls, create messages, etc.

Figure 10:
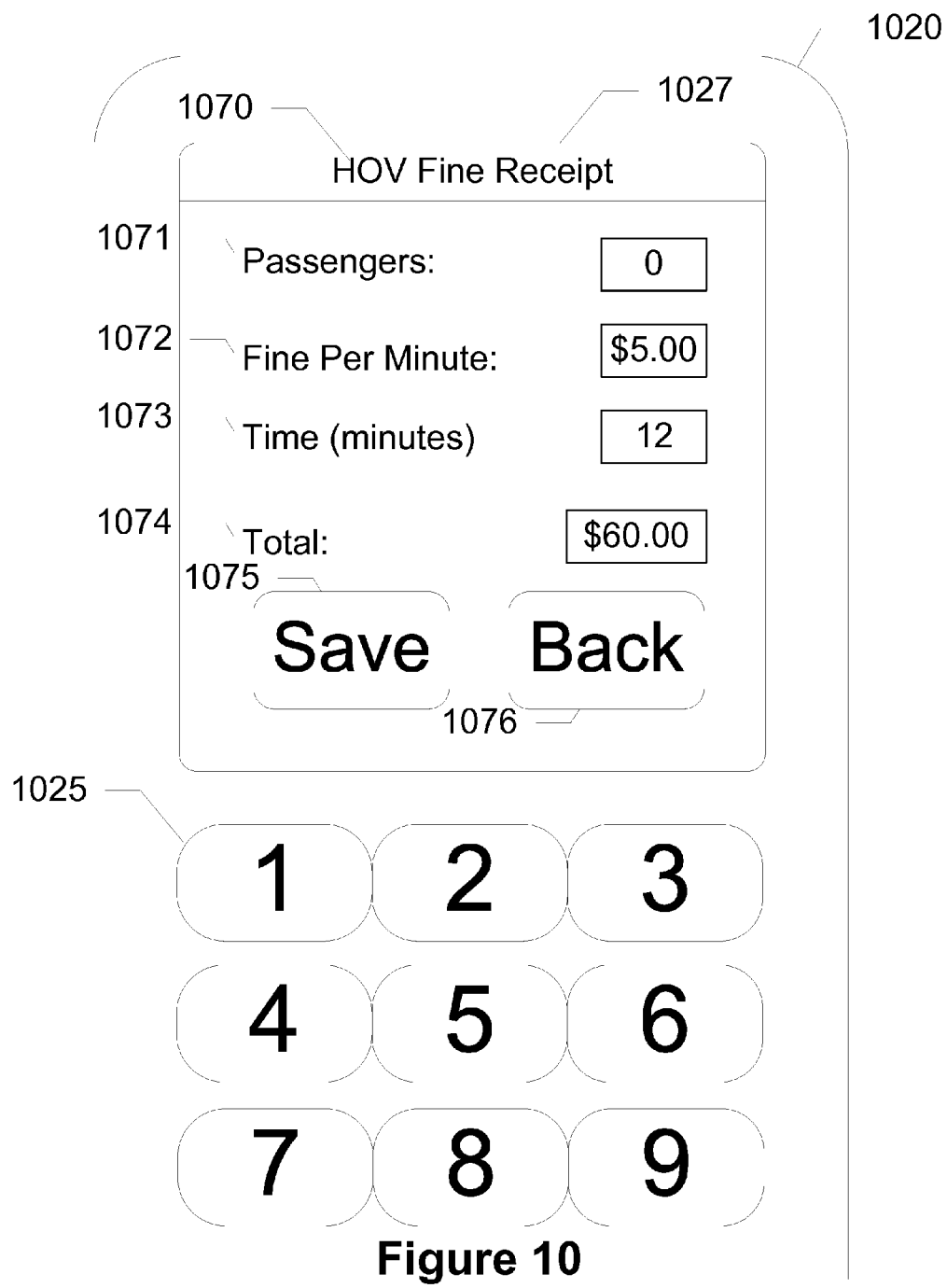
FIG. 10 shows a screenshot of an HOV lane fine, according to an exemplary embodiment of the present invention.

FIG. 10 shows a screenshot of an HOV Fine Receipt 1070 on a wireless communication device 1020, according to an exemplary embodiment of the present invention. Wireless communication device 1020 has a keypad 1025, a screen 1027, and HOV Fine Receipt 1070 displayed on screen 1027. HOV Fine Receipt 1070 includes a passenger count 1071, a fine per minute 1072 for traveling without passengers in the HOV lane, a total time 1073, and a total amount 1074 for the fee. In this instance, the driver has traveled in the HOV lane for 12 minutes without any passengers, thereby incurring a $5.00 per minute fee, totaling $60.00. HOV Fine Receipt 1070 can be received in the form of a text message, or on an application on wireless communication device 1020. The driver has the option of saving 1075 or returning 1076 to a previous screen.

The present invention also allows for several secondary means of driver identification. One can conceive of situations where an occupant of a smart vehicle is not instantly detectable using the methods described above. For instance, a wireless communication device may be switched off or a battery dies. The wireless communication device may be placed in a purse or bag and put in the back seat, or another part of the vehicle, or held by a passenger. This can result in mistaken driver identification. Alternatively, some users may attempt to spoof the system to avoid charges. Therefore, the smart vehicle includes a plurality of secondary identification means, including biometrics and weight sensors. These backup means for driver and passenger identification introduce a redundancy to the present invention, allowing the billing system to verify that the correct party is being appropriately billed, thereby reducing identification and billing errors.

Figure 11:
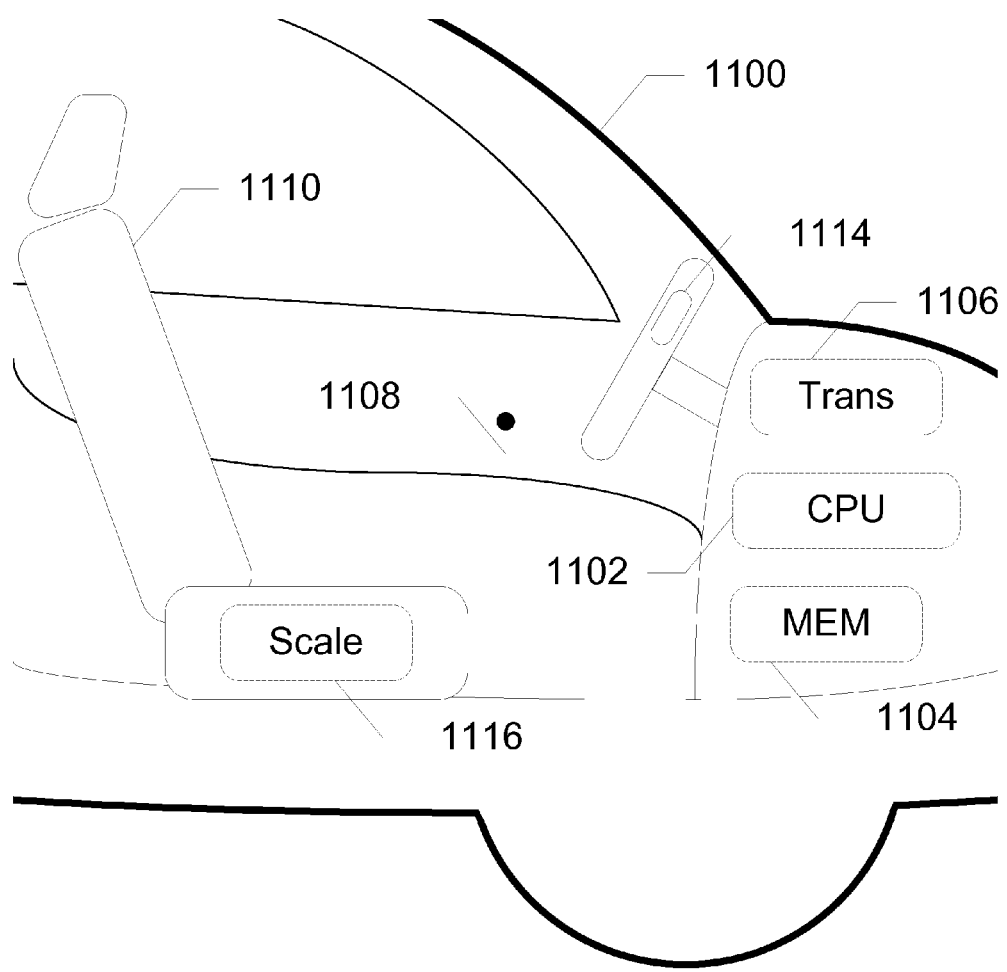
FIG. 11 shows secondary means for verifying a driver's identity, according to an exemplary embodiment of the present invention.

FIG. 11 shows secondary means for verifying a driver's identity, according to an exemplary embodiment of the present invention. Smart vehicle 1100 comes equipped with a CPU 1102, a memory 1104, a transceiver 1106, an antenna 1108, and a driver seat 1110. As described above, CPU 1102, based on logic stored on memory 1104, controls transceiver 1106 to detect the presence of and unique identifiers from any wireless communication devices located within smart vehicle 1100. A driver's wireless communication device is identified by its relative proximity to antenna 1108, which is positioned significantly closer to driver seat 1110 than any other seat in smart vehicle 1100.

However, in the case that an identity of a driver cannot be ascertained, smart vehicle 1100 includes a plurality of secondary sensors. These include a biometric identifier 1114, for instance, a fingerprint scanner placed on the steering wheel. A database of drivers' fingerprints is stored on memory 1104 or externally on a network, and the detected fingerprint is associated with a driver's identity. Although this can be used for security purposes (such as starting the vehicle, reporting a stolen vehicle, etc.) or for convenience purposes (such as adjusting the seat back/position/mirrors based on the identified driver), the present invention uses this biometric identifier to associate the driver with a user account associated with the driver. Thus, if the driver's wireless communication device is switched off or undetectable, the driver can still be billed for driving in a particular location.

Smart vehicle 1100 further includes a weight scale 1116 coupled to driver seat 1110. Weight scale 1116 determines a weight of a driver. Weight scale 1116 can include a strain gauge, piezoelectric sensor, etc. The measured weight serves several purposes; including identifying whether or not a driver is present in the vehicle, such that an improper driver identification is avoided if a passenger's wireless communication device is detected to be in proximity of antenna 1108. Further, a particular weight or range of weights can be programmed to correspond to specified driver profiles, such that smart vehicle 1100 is aware which driver is driving smart vehicle 1100, and thereby transmits the appropriate driver's identity to the billing server. Combinations of these secondary sensors are possible, and will be apparent to one skilled in the art in light of this disclosure.

Figure 12:
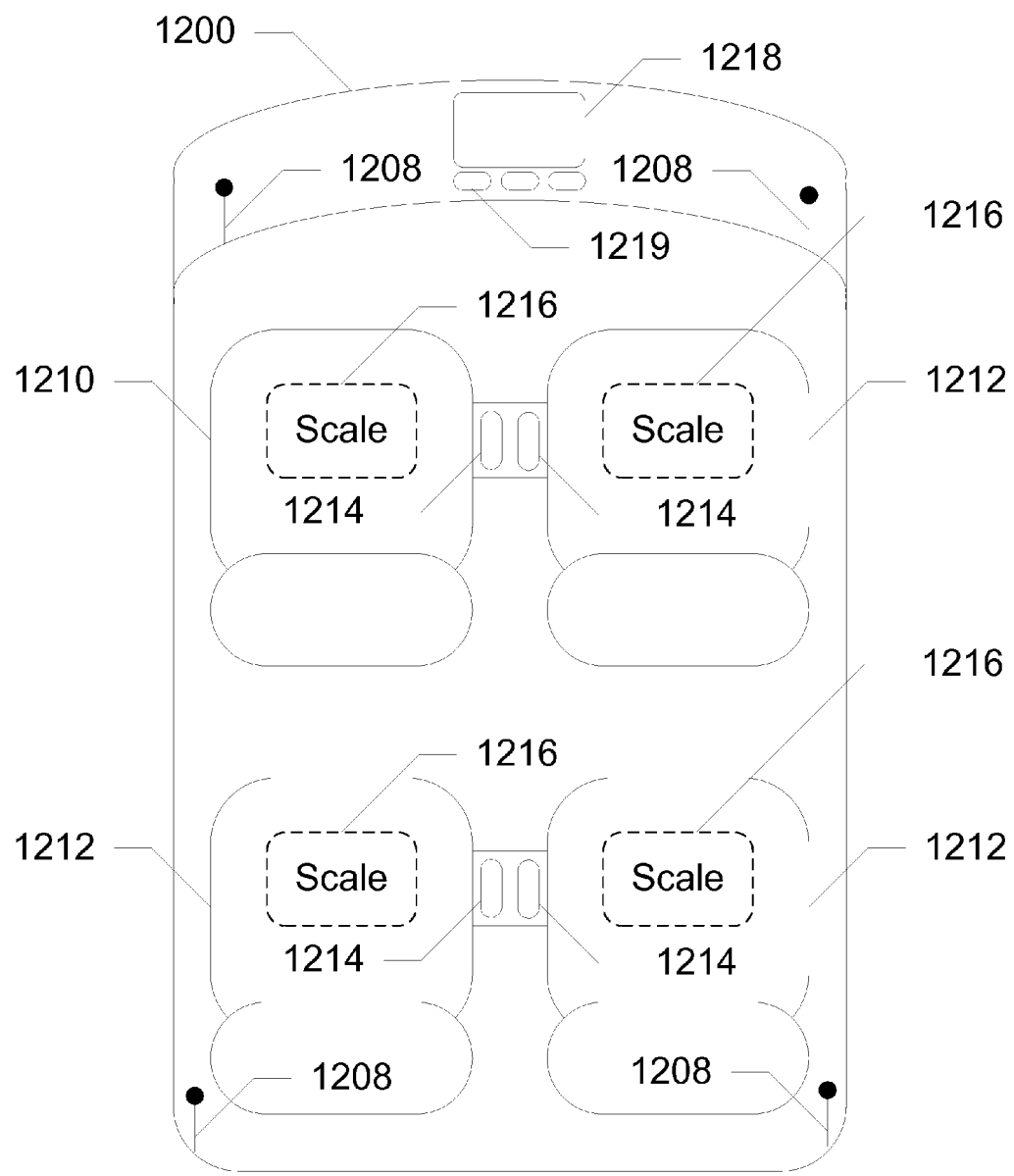
FIG. 12 shows a smart vehicle including backup sensors and an in-dash display, according to an exemplary embodiment of the present invention.

The concept of backup identification can also be applied to the passengers in the smart vehicle. FIG. 12 shows a smart vehicle 1200 including backup sensors and an in-dash display 1218, according to an exemplary embodiment of the present invention. In this embodiment, smart vehicle 1200 includes four antennae 1208, positioned on each corner of smart vehicle 1200. Each antenna is positioned substantially closer to one of the seats than any other seat. Each seat is further equipped with a biometric sensor, such as fingerprint readers 1214, and weight scales 1216. Smart vehicle 1200 also has in-dash display 1218 and a control panel 1219 in communication with a processor and memory (not shown).

The secondary sensors 1214 and 1216 serve to verify an identity of a driver and passengers as described above. Furthermore, weight scales 1216 can help smart vehicle 1200 to determine a number of passengers regardless of whether or not the passengers have wireless communication devices. Therefore, the number of passengers can be counted even if no unique identifiers are received by antennae 1208. Furthermore, fingerprint readers 1214 provide a verification of the identity of passengers, so as to prevent spoofing, and/or to avoid billing errors in case a wireless communication device belonging to a driver or a passenger is moved around the vehicle. In some exemplary embodiments weight scales 1216 are used merely to determine passenger presence and not necessarily passenger identity.

Finally, in-dash display 1218 and control panel 1219 respectively serve as output and input devices to control smart vehicle 1200. Specifically, in the situation that a toll needs to be paid, an output on in-dash display 1218 prompts a driver or passenger to determine which one of the plurality of occupants wants to pay the toll. This is an alternative to the embodiment where a message is transmitted to the wireless communication devices of each occupant. In this case, an occupant can select who makes the payment simply by using control panel 1219. Other status updates and location updates can be displayed on in-dash display 1218.

Figure 13A:
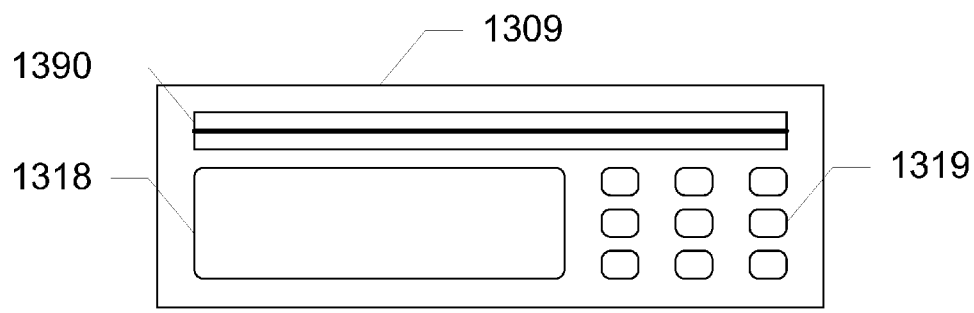
FIGS. 13A-13B show an aftermarket smart vehicle upgrade, according to an exemplary embodiment of the present invention.
Figure 13B:
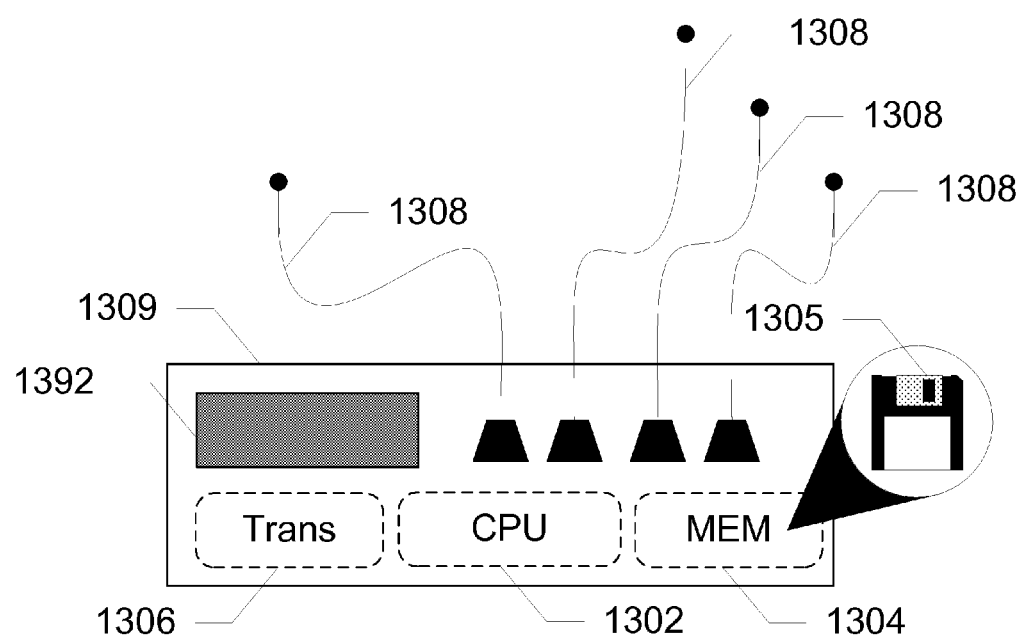

The above embodiment disclosed a smart vehicle having an in-dash display and a control panel to control the smart vehicle. However, the present invention allows for the entire functionality of the smart vehicle to be incorporated into a single aftermarket unit that can be used to upgrade any basic vehicle into a smart vehicle. FIGS. 13A-13B show such an aftermarket smart vehicle upgrade 1309, according to an exemplary embodiment of the present invention. Upgrade 1309 mimics the form factor of traditional in-dash head units such as CD players or car audio receivers, and includes a display 1318, a control panel 1319, and can also include a disc-reader 1390. Display 1318 is any LCD or equivalent display, control panel 1319 includes buttons, sliders, etc., and disc reader 1390 can play audio and data discs such as CDs, DVDs, etc. The inner components of upgrade 1309 include a CPU 1302, a memory 1304 having client logic 1305 stored therein, a transceiver 1306, a plurality of antennae 1308, and a wire harness 1392. The functions of CPU 1302, memory 1304, transceiver 1306, and antennae 1308 in the aftermarket unit are substantially similar to the functions of the equivalent components of the smart vehicle, which have been amply described above. Note that the placement of antennae 1308 is flexible, thereby allowing a user to configure the upgrade to conform to a particular vehicle. Each antenna 1308 has a long wire connecting it to upgrade 1309 allowing each antenna 1308 to be placed anywhere inside the vehicle.

Wire harness 1392 provides an interface to other components of a vehicle. In traditional in-dash head units, wire harnesses 1392 provide an interface to the speakers, amplifiers, fuse boxes, and other electrical systems of a vehicle. In this embodiment, wire harness 1392 can further provide an interface to various sensors within the vehicle, such as speedometers, external transceivers, biometric/weight sensors embedded in the seats, etc. Therefore a user who installs upgrade 1309 in their vehicle can control several "smart" features via display 1318 and control panel 1319. Further, logic 1305 can be programmed to include several presets corresponding to existing vehicles, and disc reader 1390 can be used to program new presets, load databases of locations corresponding to HOV lanes, toll booths, maps, and other information.

A wireless communication device includes many devices having a processor, memory, and transceiver. A contactless smart card includes all of the above, and in some embodiments, can be integrated into any object that a driver or passenger carries around all the time. Thus, no extra effort is needed to ensure that the wireless communication device is on the user's person at all times. For instance, a contactless smart card can be embedded in a user's driver's license. Since the driver is required by law to carry positive identification at all times while driving, a smart vehicle equipped with a contactless smart card reader will always be able to determine the driver's identity, and therefore bill the driver based on a location of the smart vehicle.

FIGS. 14A-14B show a contactless smart card embedded in a driver's license 1494, according to an exemplary embodiment of the present invention. Driver's license 1494 includes embedded within it a CPU 1495, a memory 1496 having wireless logic 1497 stored therein, a transceiver 1498 and an antenna 1499. CPU 1495 controls the sending and receiving of signals via transceiver 1498 based on wireless logic 1497 stored on memory 1496. Antenna 1499 receives RF signals from the smart vehicle and transmits them to transceiver 1498. Antenna 1499 further acts as an inductor to capture the RF signal from the smart vehicle, rectify it, and thereby power the other components. In an alternative embodiment, the contactless smart card includes a power supply, thereby allowing driver's license 1494 to communicate across greater distances. Memory 1496 additionally stores a unique identifier for the driver. Upon receiving an RF query from the smart vehicle, logic 1497 retrieves the stored unique identifier and transmits it to the smart vehicle via transceiver 1498.

FIG. 15 shows a smart vehicle 1500 detecting a driver's license 1594, according to an exemplary embodiment of the present invention. Driver's license 1594, including wireless logic 1597 is in communication with an antenna 1508 of smart vehicle 1500. Client logic 1505 onboard smart vehicle 1500 enables antenna 1508 to transmit an RF query within smart vehicle 1500. The RF query is sensed by an antenna of driver's license 1594. Wireless logic 1597, in response, transmits a unique identifier corresponding to the driver's identity back to client logic 1505. As described in the embodiments above, client logic 1505 determines that the unique identifier corresponds to a driver's identity, depending on the placement of antennas 1508, and the strength and/or latency of the received signal. Upon a determination of the driver's identity, this information, along with a location of smart vehicle 1500, can be transmitted to a billing server.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for billing a driver of a vehicle, the system comprising:
   a network;
   a billing server on the network, the billing server including a user account for a user of a first wireless communication device in communication with a smart vehicle, the smart vehicle in communication with the network and a second wireless communication device; and
   a server logic on the billing server includes instructions that when executed by a server processor perform operations including associating a first unique identifier with a user account, and billing the user account an amount based on a location of the smart vehicle;
   wherein a client logic on the smart vehicle includes instructions that when executed by a vehicle processor perform operations including retrieving the first unique identifier from the first wireless communication device and a second unique identifier from the second wireless communication device, determining that the first wireless communication device corresponds to a driver of the vehicle, determining the location of the smart vehicle, and transmitting the first unique identifier and the location to the billing server.

2. The system of claim 1, wherein the location includes any one of a lane on a highway, a toll booth, and a geo-fence.

3. The system of claim 2, further comprising an NFC transceiver in the location, the NFC transceiver being in communication with the smart vehicle.

4. The system of claim 1, further comprising:
   a driver seat in the smart vehicle;
   a passenger seat in the smart vehicle;
   a plurality of wireless communication devices in communication with the smart vehicle, the plurality of wireless communication devices including the first and second wireless communication devices; and
   an antenna coupled to the smart vehicle, the antenna being positioned significantly closer to the driver seat than the passenger seat;
   wherein the client logic includes further instructions that when executed by the vehicle processor perform additional operations including:
      retrieving a unique identifier from each of the plurality of wireless communication devices, each unique identifier corresponding to one of a plurality of user accounts, and
      determining which of the plurality of wireless communication devices corresponds to a driver of the vehicle.

5. The system of claim 1, further comprising a billing notification received at the first wireless communication device.

6. The system of claim 1, further comprising one of a biometric sensor and a weight scale coupled to a seat in the smart vehicle.

7. The system of claim 1, wherein the first and second wireless communication devices are contactless smart cards.

8. A method for billing a driver of a smart vehicle in communication with a first wireless communication device and a second wireless communication device, the method comprising:
   receiving a first unique identifier from the first wireless communication device and a second unique identifier from the second wireless communication device;
   determining that a user of the first wireless communication device is a driver of the smart vehicle;
   determining the location of the smart vehicle; and
   transmitting the first unique identifier and the location to a billing server on a network;
   wherein the first unique identifier is associated with a user account for the user, and the location is associated with an amount to be debited from the user account.

9. The method of claim 8, wherein the location includes one of a lane on a highway, a toll booth, and a geo-fence.

10. The method of claim 8, wherein determining the location further comprises querying an NFC transceiver in communication with the smart vehicle.

11. The method of claim 8, wherein determining the driver of the smart vehicle includes receiving the first unique identifier from the wireless communication device via an antenna positioned significantly closer to a driver seat of the smart vehicle than a passenger seat of the smart vehicle.

12. The method of claim 8, further comprising:
   transmitting a billing notification to the first wireless communication device; and
   receiving a billing confirmation from the first wireless communication device.

13. The method of claim 8, further comprising:
   determining the number of passengers in the smart vehicle; and
   billing the user account based on the number of passengers in the smart vehicle.

14. The method of claim 8, further comprising billing the user account based on a speed of the vehicle.

15. A smart vehicle, comprising:
   a vehicle having a driver seat and a passenger seat;
   a processor coupled to the vehicle;
   a memory in communication with the processor;
   a transceiver in communication with the processor;
   an antenna coupled to the transceiver, the antenna positioned significantly closer to the driver seat than to the passenger seat; and
   a client logic on the memory including instructions that when executed the processor performs operations including
      retrieving a first unique identifier from a first wireless communication device and a second unique identifier from a second wireless communication device,
      determining that the first wireless communication device corresponds to a driver of the vehicle,
      determining a location of the vehicle, and
      transmitting the first unique identifier and the location to a billing server on a network,
   wherein the first unique identifier is associated with a user account for the user, and the location is associated with an amount to be debited from the user account.

16. The smart vehicle of claim 15, wherein the location includes any one of a lane on a highway, a toll booth, and a geo-fence.

17. The smart vehicle of claim 15, wherein the transceiver communicates with an NFC transceiver in the location.

18. The smart vehicle of claim 15, wherein the client logic includes further instructions that when executed by the processor perform additional operations including receiving a plurality of unique identifiers from a plurality of wireless communication devices in communication with the smart vehicle, the plurality of wireless communication devices including the first and second wireless communication devices.

19. The smart vehicle of claim 15, further comprising a biometric sensor.

20. The smart vehicle of claim 15, further comprising a weight scale coupled to a seat in the vehicle.

* * * * *